US011060196B2

(12) United States Patent
Colomar

(10) Patent No.: US 11,060,196 B2
(45) Date of Patent: Jul. 13, 2021

(54) SYSTEM FOR PRODUCING DIHYDROGEN, AND ASSOCIATED METHOD

(71) Applicant: ELECTRICITE DE FRANCE, Paris (FR)

(72) Inventor: David Colomar, Haguenau (FR)

(73) Assignee: Electricite de France ( * ) Notice: Subject to any disclaimer, the term of this patent is extended or adjusted under 35 U.S.C. 154(b) by 680 days.

(21) Appl. No.: 15/578,197

(22) PCT Filed: Jun. 2, 2016

(86) PCT No.: PCT/FR2016/051324
§ 371 (c)(1),
(2) Date: Nov. 29, 2017

(87) PCT Pub. No.: WO2016/193633
PCT Pub. Date: Dec. 8, 2016

(65) Prior Publication Data
US 2018/0148847 A1 May 31, 2018

(30) Foreign Application Priority Data
Jun. 2, 2015 (FR) .................................... 1555016

(51) Int. Cl.
C25B 1/12 (2006.01)
C25B 1/04 (2021.01)
(Continued)

(52) U.S. Cl.
CPC .................. C25B 1/04 (2013.01); C25B 9/05 (2021.01); C25B 15/02 (2013.01); C25B 15/08 (2013.01); Y02E 60/32 (2013.01); Y02E 60/36 (2013.01)

(58) Field of Classification Search
CPC ..... C25B 1/02–12; C25B 15/02; C25B 15/08; C25B 1/12; C25B 1/04; Y02E 60/32;
(Continued)

(56) References Cited

U.S. PATENT DOCUMENTS 4,087,976 A * 5/1978 Morrow, Jr. .......... F01K 25/005
60/643
8,114,363 B1 * 2/2012 Golben ..................... C25B 1/04
422/600

(Continued)

OTHER PUBLICATIONS

Vanhanen et al., "Combined hydrogen compressing and heat transforming through metal hydrides", International Journal of Hydrogen Energy, 1999, vol. 24, No. 5, pp. 441-448.
(Continued)

Primary Examiner — Xiuyu Tai
(74) Attorney, Agent, or Firm — Lerner, David, Littenberg, Krumholz & Mentlik, LLP

(57) ABSTRACT

The invention concerns a system (1) for producing dihydrogen comprising: —a high-temperature electrolyser (2) suitable for implementing steam electrolysis at a temperature greater than 500° C. and producing a mixture of steam and dihydrogen; —a dihydrogen compressor (3); —a main water and dihydrogen circuit (10) on which at least an evaporator (11), the high-temperature electrolyser (2), a condenser (E3) and the compressor (3) are arranged in succession, a first heat exchanger (E1) bringing the steam from the evaporator (11) and the mixture of steam and dihydrogen from the high-temperature electrolyser (2) into heat exchange so as to superheat the steam from the evaporator (11); the system being characterised in that—the compressor (3) is a chemical compressor supplied with heat by heat exchange with the condenser (E3); —the condenser (E3) is disposed directly at the outlet of the first exchanger (E1).

16 Claims, 5 Drawing Sheets

(51) Int. Cl.
*C25B 15/02* (2021.01)
*C25B 15/08* (2006.01)
*C25B 9/05* (2021.01)

(58) Field of Classification Search
CPC ......... Y02E 60/36; Y02E 70/20; Y02E 70/10; Y02E 60/366; Y02E 60/50; F01K 25/005; H01M 8/0656; Y02P 20/133; Y02P 20/134; Y02P 20/129; Y10S 204/04
See application file for complete search history.

(56) References Cited

U.S. PATENT DOCUMENTS

| | | | | |
|---|---|---|---|---|
| 2007/0000789 | A1* | 1/2007 | Libby | C25B 1/04 205/637 |
| 2008/0289955 | A1* | 11/2008 | Balestrino | H01M 8/186 204/274 |
| 2011/0223507 | A1* | 9/2011 | LaVen | H01M 8/04298 429/437 |
| 2014/0144785 | A1* | 5/2014 | Farchmin | C25B 1/10 205/345 |
| 2017/0314143 | A1* | 11/2017 | Emerick | C25B 9/08 |
| 2018/0287179 | A1* | 10/2018 | Rueger | C25B 1/12 |

OTHER PUBLICATIONS

Sigurvinsson et al., "Can high temperature steam electrolysis function with geothermal heat?", International Journal of Hydrogen Energy, 2007, vol. 32, No. 9, pp. 1174-1182.

Rivera-Tinoco et al., "Influence of cell support and operating parameters on the competitiveness of high-temperature electrolysis process", International Journal of Green Energy, 2010, vol. 7, No. 1, pp. 1-20.

Preliminary Research Report received for French Application No. 1555016, dated Mar. 7, 2016, 4 pages (1 page of French Translation Cover Sheet and 3 pages of original document).

Lototskyy et al., "Metal hydride hydrogen compressors: A review", International Journal of Hydrogen Energy, 2014, vol. 39, No. 11, pp. 5818-5851.

Laurencelle et al., "Integrated electrolyser-metal hydride compression System", International Journal of Hydrogen Energy, 2006, vol. 31, No. 6, pp. 762-768.

Laurencelle et al., "Experimental study on a metal hydride based hydrogen compressor," Journal of Alloys and Compounds, 2009, vol. 475, No. 1-2, pp. 810-816.

International Search Report and Written Opinion received for PCT Patent Application No. PCT/FR2016/051324, dated Sep. 12, 2016, 22 pages (10 pages of English Translation and 12 pages of Original Document).

International Preliminary Report on Patentability received for PCT Patent Application No. PCT/FR2016/051324, dated Dec. 14, 2017, 18 pages (9 pages of English Translation and 9 pages of Original Document).

* cited by examiner

SYSTEM FOR PRODUCING DIHYDROGEN, AND ASSOCIATED METHOD

GENERAL TECHNICAL FIELD

The present invention relates to a dihydrogen production system by means of electrolysis.

State of the Art

Within a context of strong development of decarbonised solutions, that is low carbon dioxide emissive solutions, for mobility and transport of goods and passengers, dihydrogen appears as a promising fuel.

Its use, associated with fuel cells and an electric motor in a vehicle, can be an alternative to fossil fuels, especially if it is produced by energies which are themselves clean, in particular by water electrolysis. Some car manufacturers, like Toyota, have already begun to market hydrogen vehicles, others will launch their first vehicles by 2020.

The operation of a fuel cell (an example of which is represented in FIG. 1a) is governed by the following oxidation-reduction reactions:

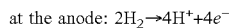

at the anode: $2H_2 \rightarrow 4H^+ + 4e^-$

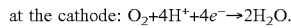

at the cathode: $O_2 + 4H^+ + 4e^- \rightarrow 2H_2O$.

The flow of electrons produced at the anode can thus supply an electrical load before being forwarded to the cathode.

Hydrogen is nowadays predominantly produced in large quantities by hydrocarbon steam reforming, mainly from natural gas (methane, the steam reforming reaction being thereby described by the following equation: $CH_4 + 2H_2O +$ heat $\rightarrow 4H_2 + CO_2$), transported and delivered by trucks in cylinder frames at 200 bar in a service station, where it is compressed in a compressor up to pressures of 450 to 900 bar, before being stored in high pressure tanks in the service station (indeed, the low volume density of dihydrogen gas—89 grams, that is 3.54 kWh energy, in one cubic metre of hydrogen under normal temperature and pressure conditions—implies to compress it around 700 bar to reach a sufficient density for use as a fuel).

This system forming production method has the advantage of being industrially mature and cheap. However, it has many drawbacks: it consumes fossil energy, is high carbon dioxide emitting, and is well adapted only to large scale production in large size units (up to several hundreds of MW). In the case of a decentralised hydrogen use, the hydrogen produced should be transported by trucks, and should be delivered in cylinder frames, which causes substantial economic and energy costs.

Thus, industrialists increasingly opt for an alternative technology: water electrolysis, which uses electricity instead of fossil energies to separate hydrogen from oxygen and can be made in small decentralised units, or even in the place where the hydrogen is used, for example the service station. The electrolysis principle can be summarised by the following equation: $2H_2O + \text{electricity} \rightarrow 2H_2 + O_2$.

Electrolysis has many advantages: it does not produce carbon dioxide if electricity is decarbonised (for example of nuclear or renewable origin), it is flexible and can thus provide service for the electrical grid and it is a modular technology, which can be of a small size (less than one MW) and thus well adapted to decentralised production. On the other hand, it has the drawback to consume an expensive energy: electricity. Thus, its yield is a crucial issue.

There are three main electrolysis technologies. The first two ones, that is alkaline and PEM ("proton exchange membrane", or proton exchange membrane technology) technologies are nowadays mature and marketed. The energy consumption of these electrolysers amounts at best at about 55 kWh/kg hydrogen, which represents an energy yield in the order of 72%.

The third one is high temperature electrolysis (HTE), which is currently developed. The high temperature electrolysers exhibit an energy consumption in the order of 45 kWh/kg of hydrogen, that is an energy yield in the order of 87%.

This technology, described for example in the document "Can high temperature steam electrolysis function with geothermal heat?" by J. Sigurvinsson, C. Mansilla, P. Lovera and F. Werkoff, International Journal of Hydrogen Energy, suggests to electrolyse water as superheated steam at a temperature of at least 500° C., advantageously in the order of 800° C.

This technology turns out to be more efficient than water electrolysis at ambient temperature, since part of the energy necessary to the reaction can be brought by heat (cheaper than electricity) and that the energy yield is better. Theoretically, at a temperature of 2 500° C., no more work input would be necessary because thermolysis would spontaneously decompose water into hydrogen and oxygen. In view of the operating conditions, the best compromise remains reached at about 800° C.

In reference to FIG. 1b, there are known optimised HTE systems 1 offering energy yields of 80% (defined as r=GCV/Qinv, where Qinv is the energy being invested, that is consumed in the facility and GCV the gross calorific value, that is the energy content of the hydrogen being obtained, which amounts to 39.4 kWh/kg). In the following of the disclosure, and in order to compare different facilities to each other, a system 1 producing 1 kg of hydrogen at 200 bar will be considered.

The steam is herein produced in an evaporator 11 (energy input of 8.4 kWh), and then superheated from the outlet gases from the electrolyser 2 via the exchangers E1 and E2 and an electrical superheater 12 (energy input of 1 kWh). Liquid water is also preheated thanks to the outlet gases via the exchangers E3 and E4. The high electrolyser yield results in that it does not need an integrated cooling system. The electrolyser is coupled with a mechanical compressor 3 which consumes 4 kWh of energy to rise the pressure to 200 bar.

The energy yield of such a device is the following one:

$r = GCV/Qinv = 39.4/(35.7 + 1 + 8.4 + 4)$ $r = 80\%$.

It would be desirable to further improve this yield to speed up break through of an industrial large scale hydrogen use.

DISCLOSURE OF THE INVENTION

The invention suggests to overcome these drawbacks by providing according to a first aspect a dihydrogen production system comprising:
- a high temperature electrolyser adapted to implement steam electrolysis at a temperature higher than 500° C. and produce a steam and dihydrogen mixture;
- a dihydrogen compressor;
- a main water and dihydrogen circuit on which at least one evaporator, the high temperature electrolyser, a condenser and the compressor are successively disposed, a first exchanger operating heat exchange between the steam from the evaporator and the steam and dihydrogen mixture from the high temperature electrolyser so as to superheat the steam from the evaporator;

the system being characterised in that the compressor is a chemical compressor supplied with heat by heat exchange with the condenser;

the condenser is directly disposed at the outlet of the first exchanger.

The device according to the invention is advantageously completed by the following characteristics, taken alone or according to any technically possible combination:

the first exchanger is configured such that the steam and dihydrogen mixture exhibits a temperature of at least 200° C.;

the system further comprises a dioxygen circuit from the high temperature electrolyser, on which a second exchanger operating heat exchange between the steam from the evaporator and the dioxygen from the high temperature electrolyser is disposed so as to superheat the steam from the evaporator;

the system further comprises a third exchanger operating heat exchange between the liquid water from the main circuit upstream of the evaporator and the dioxygen from the second exchanger so as to preheat the liquid water entering the evaporator;

the system further comprises a first superheater disposed on the main circuit upstream of the high temperature electrolyser so as to superheat the steam from the evaporator;

the system further comprises a fourth exchanger operating heat exchange between the liquid water from the main circuit upstream of the evaporator and the dihydrogen exiting from the condenser so as to preheat the liquid water entering the evaporator;

the fourth exchanger is a second condenser;

the main circuit receives the condensates from the condenser;

the main circuit has a branch for circulating the condensates from the condenser and a mixer for the liquid water mixture from the fourth exchanger and said condensates;

the chemical compressor is a metal hydride compressor;

said metal hydrides are rare earth hydrides;

the chemical compressor has a single reactor;

a purification system and/or a drying system are disposed on the main circuit between the condenser and the compressor;

the system comprises a heat circuit for heat transfer from the condenser to the compressor;

the fluid of the heat circuit has a temperature of at least 120° C. at the inlet of the compressor;

the heat circuit has a second superheater to superheat the fluid of the circuit at the outlet of the condenser.

According to a second aspect, the invention relates to a dihydrogen production method characterised in that it comprises the steps of:

evaporating liquid water of a main water and dihydrogen circuit in an evaporator;

superheating the steam in at least one first exchanger at a temperature higher than 500° C.;

electrolysing the steam in a high temperature electrolyser so as to produce a steam and dihydrogen mixture;

cooling said the steam and dihydrogen mixture by heat exchange via the first exchanger;

condensing steam from said mixture directly at the outlet of the first exchanger in a condenser;

compressing the dihydrogen by a chemical compressor, supplied with heat by heat exchange with the condenser.

DESCRIPTION OF THE FIGURES

Further characteristics, purposes and advantages of the invention will become more apparent from the description that follows, which is purely illustrative and in no way limiting, and which should be read with regard to the appended drawings in which.

the previously described

the previously described

In the different figures, similar elements bear the same reference numerals, and the temperature and pressure values indicated are only by way of non-limiting example.

DETAILED DESCRIPTION

General Architecture

Figure 2A:
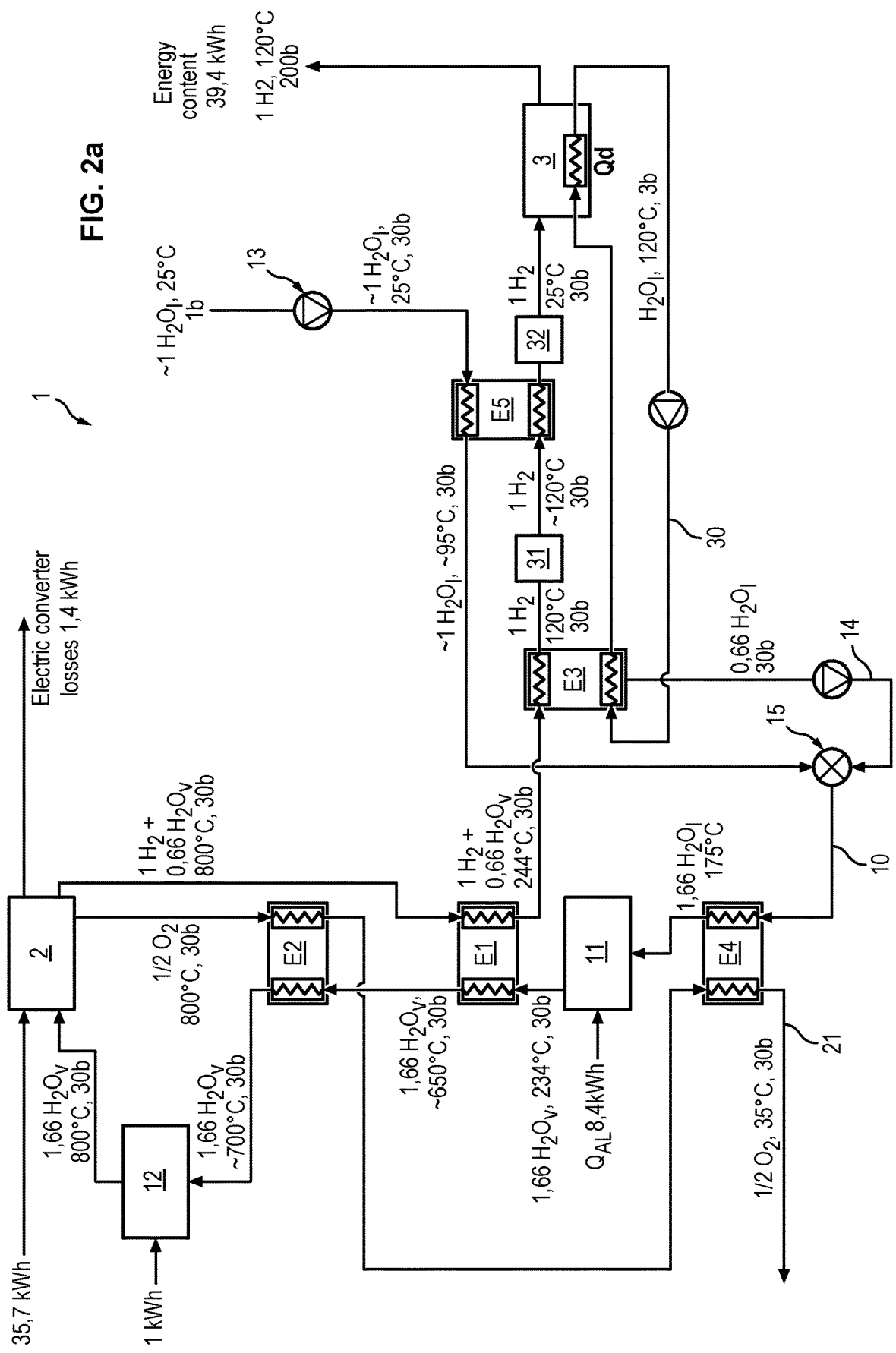
FIGS. 2a and 2b are diagrams of two particularly preferred embodiments of a dihydrogen production system according to the invention.

FIG. 2a represents a first preferred embodiment of the present dihydrogen production system 1.

This system comprises two main components, that is a high temperature electrolyser 2 and a dihydrogen gas compressor 3.

By high temperature electrolyser 2, it is meant an electrolyser adapted to implement a steam electrolysis at a temperature higher than 500° C. (preferentially about 800° C.) and to produce a steam and dihydrogen mixture. More precisely, a porous cathode receives steam and converts it partly into dihydrogen. Pure dioxygen is formed at a porous anode. In reference to FIG. 2a, for 1.66 mole of steam at the inlet, 1 mole of dihydrogen is produced (0.66 mole of steam is thus released as such), and 0.5 mole of dioxygen is produced.

Such high temperature electrolysers (called "HTE") are known, and have not to be mistaken for standard electrolysers which consume liquid water at temperatures in the order of the ambient temperature.

The system 1 further comprises a main water and dihydrogen circuit 10 on which at least one evaporator 11, the high temperature electrolyser 2, a condenser E3 and a compressor 3 are successively disposed.

More precisely, this main circuit 10 is initially a liquid water circuit up to the evaporator 11 (which vaporises this liquid water), and then a steam circuit up to the HTE 2 (which decomposes a fraction of the steam into dihydrogen and dioxygen), and then a steam and dihydrogen circuit up to the condenser E3 (which condenses the remaining steam into liquid water), and then a dihydrogen circuit up to the compressor 3. The fluid pressure in the main circuit 10 is typically a few tens of bars, advantageously about 30 bar, thanks to a pump 13 disposed upstream of the evaporator 11 so as to compress the liquid water. The consumption of such a pump is insignificant relative to other energy expenditures of the system 1.

As will be seen, many exchangers or pieces of thermal equipment are disposed along the main circuit 10, in particular to superheat steam between the evaporator 11 and the HTE 2 so as to reach the high temperature levels required.

The system 1 further comprises a dioxygen circuit 21 from the HTE 2 (as explained, dioxygen is generated at the anode). This circuit is independent from the main circuit 10, but as will be seen, it is advantageously in heat exchange with the latter to recover heat from this dioxygen.

A first feature of the present system is that the compressor 3 is a chemical compressor.

Chemical Compressor

Hydrogen compression is today almost exclusively made mechanically. It is mainly membrane compressors or piston compressors supplied with compressed air. The ionic compression is also known, which replaces mechanical pistons with ionic liquids, wherein some gases are not soluble.

By way of indicating purposes, it can be considered that for membrane compressors, the energy consumption related to hydrogen compression from an electrolyser up to a pressure of 200 bar amounts to about 4 kWh/kg.

In addition to their high energy consumption, the mechanical compressors have other drawbacks: they require much maintenance because of the wear of the movable parts and seals, and they bring about noise annoyances, which can be of an issue in an urban environment.

By chemical compression, it is meant a pressure increase technique which is purely physico-chemical and not mechanical, i.e. without movable part. Generally, a chemical compressor changes state (in the general sense) of dihydrogen, and then recycles it at a higher pressure level (under the heat effect).

Preferably, the so-called chemical compression technique uses the adsorption phenomenon to increase pressure. The absorption is a physical and chemical process in which atoms, molecules, or ions enter a gas, liquid or solid phase, here typically metal compounds in particular of rare earths (or lanthanides) which becomes hydrides when bounded to hydrogen. The desorption is the reverse phenomenon, by which adsorbed molecules are released, in particular under the action of the temperature rise. Metal hydrides thereby come back to their normal metal state. Such chemical compressors are also called by convention "metal hydride compressors", although these metals are not permanently as hydride.

Alternatively, chemical compressors based on the fuel cell principle are known. For example, with a PEM technology, dihydrogen is dissociated into protons (by virtue of a catalyst such as platinum) crossing an ion porous but gas tight membrane, on the other side of which they are recombined with their source electrons into dihydrogen at a higher pressure. Such a compressor is called an "electrochemical compressor".

In the following of the present description, the example of a metal hydride type chemical compressor will be considered, but those skilled in the art will be able to apply the invention to the case of any chemical compressor.

Figure 3:
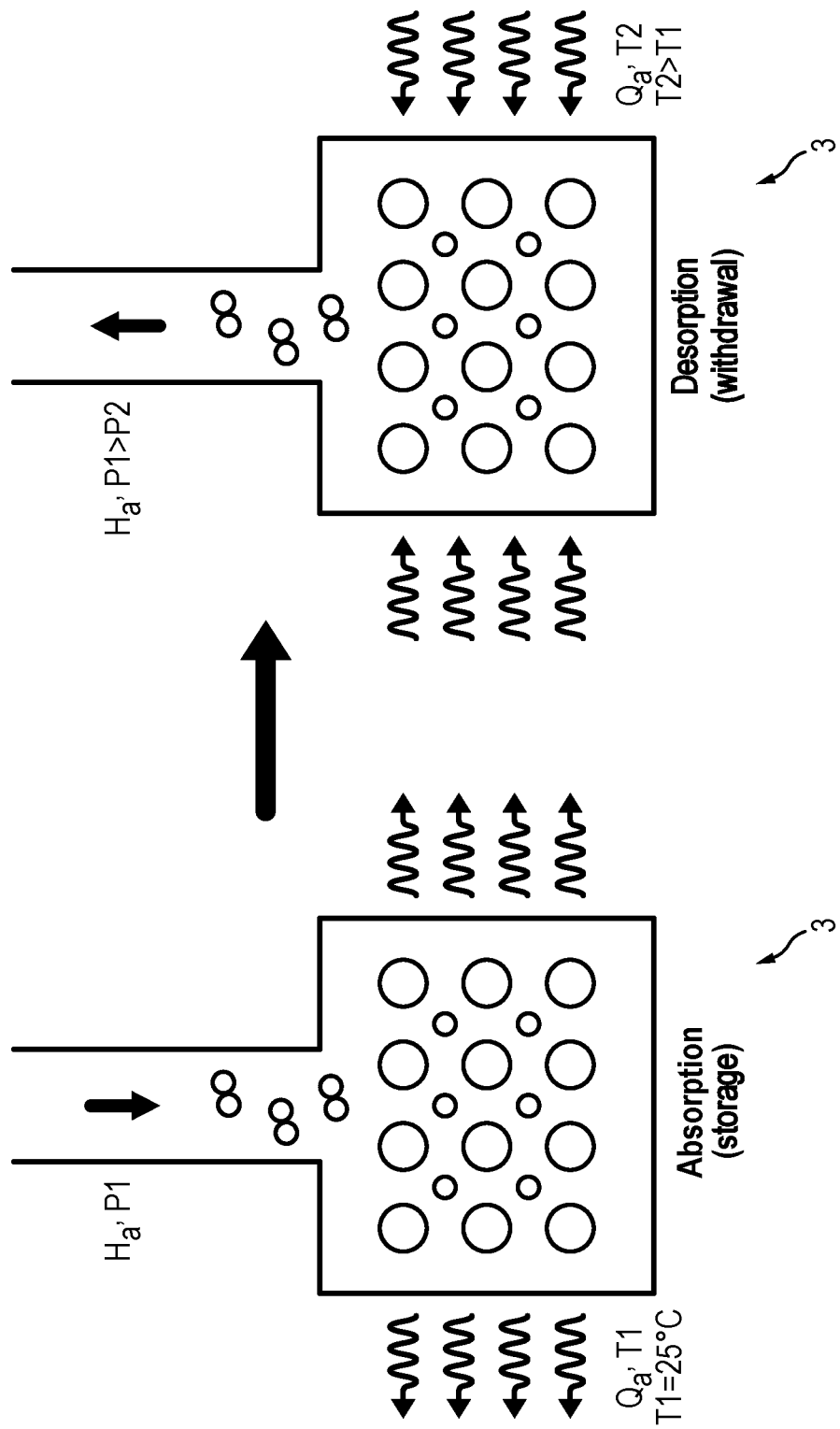
FIG. 3 is a diagram of a chemical compressor.

FIG. 3 represents kinetics of a reactor of a chemical compressor 3 for adsorbing/desorbing hydrogen by metal compounds, for example (but not exclusively) based on rare earths, for example lanthanum.

First (left view in FIG. 3) dihydrogen is injected into the reactor 6 at a pressure P1 and at a preferentially low temperature. This is the so-called absorption phase. The absorption reaction is exothermic and emits a heat quantity $Q_a$ at a preferentially low temperature T1, for example in the order of 25° C.

Secondly (right view in FIG. 3), a heat input $Q_d$ at a temperature T2>T1, will trigger the reverse phenomenon of desorption, releasing hydrogen molecules at a pressure P2>P1. The initial pressure has been amplified, as a mechanical compressor would have done, but by the "chemical" way.

The temperature T2 controls the pressure P2, the heat quantity $Q_d$ controls the quantity of substance of released dihydrogen.

The energy released during absorption is equal to that necessary for desorption. However, because of the low temperature level of the absorption heat, this is lost. The energy consumption associated with compression is thus equal to the desorption heat. This depends on the type of metal hydrides. Desorption heat between 2 and more than 4 kWh/kg of hydrogen are reported in literature. In the following of the present description, a hydride having a desorption heat in the order of 2.5 kWh/kg will be hypothesised.

Metal hydride type chemical compressors are for example described in the publication "Metal hydride hydrogen compressors: A review" by M. V. Lototskyy, V. A. Yartys, B. G. Pollet and R. C. Bowman Jr, International Journal of Hydrogen Energy.

Thereby, it has been proposed in prior art to couple a conventional low temperature electrolyser with a multistage (typically three-stage) hydride compressor. In other words, dihydrogen from the electrolyser passes through several reactors in series so as to undergo a multiple pressure rise: the outlet pressure of stage i equal to that of the inlet pressure of stage i+1, which will be amplified by the reactor i+1. Thus, a delivered pressure of 200 bar is achieved, at the outlet of the last reactor.

Here, the free heat losses of the electrolyser, in the order of 10 kWh, are valued and invested to bring the desorption heat quantities $Q_{d(i)}$ to temperatures in the order of 80° C., to the reactors in series. The energy yield of such a device is the following one:

$r=GCV/Qinv+39.4/55$ $r=72\%$.

Although the consumption of a 3 stage chemical compressor is high (3*2.5 kWh=7.5 kWh), the yield is improved by 5 points with respect to an equivalent device with a mechanical compressor, because the compressor is not supplied with electricity, but by the free heat produced by the electrolyser.

Condenser

The present system 1 combines a high temperature with a chemical compressor.

The difficulty is that it is not possible to simply recover free heat losses of the electrolyser, because they are contained in heat from the steam and dihydrogen mixture from the HTE 2.

The present system 1 solves this difficulty by the clever use of two exchangers E1, E3.

The first exchanger E1 is a known superheating exchanger disposed on the main circuit 10 (both upstream and downstream of the HTE 2). More precisely, it operates heat exchange between the steam from the evaporator 11 and the steam and dihydrogen mixture from the high temperature electrolyser 2 so as to superheat the steam from the evaporator 11. In reference to FIG. 2a, the first exchanger E1 typically enables the superheated steam to be electrolysed to be raised from 234 to 650° C., while decreasing the steam and dihydrogen mixture from the HTE 2 from 800 to 244° C.

It is noted that a second on the circuit 10 overheating exchanger E2 is advantageously disposed, this time operating heat exchange between the steam from the evaporator 11

(typically from the first exchanger E1) and the dioxygen from the high temperature electrolyser 2 so as to superheat the steam from the evaporator 11. In reference to FIG. 2a, the second exchanger E2 typically enables the superheated steam to be electrolysed to be raised from 650 to 700° C., while decreasing the dioxygen from the HTE 2 from 800 to 660° C. It is noted that the first and second exchangers E1, E2 are switchable, it will be understood that they have a joint action enabling the steam from the evaporator 11 to be superheated advantageously by more than 550° C.

The system can also comprise a first superheater 12 (typically an electrical equipment or a burner) disposed on the main circuit 10 upstream of the high temperature electrolyser 2 so as to superheat the steam from the evaporator 11. It can be downstream of the first and second exchangers E1, E2 (i.e. it superheats the steam from the first exchanger E1 and/or from the second exchanger E2) so as to enable the highest temperature level possible at the inlet of the HTE 2, typically 800° C. to be reached. As in prior art, it consumes in the order of 1 kWh (per kilogram of the dihydrogen produced).

The previously discussed exchanger E3 is a condenser. It has the role to condense the steam fraction in the mixture from the HTE 2, so as to isolate dihydrogen. Whereas prior art suggested to use heat produced by condensation to preheat the liquid water of the circuit 10 before being introduced in the evaporator 11, the present system uses it to supply the mechanical compressor 3.

The invention advantageously uses an intrinsic property to HTE where the operating fluid in the electrolyser is steam and not water. For reaction balance and mass transfer reasons, the high temperature electrolysers cannot convert all of the steam into hydrogen. As explained, the conversion rate amounts typically to 60%. A significant residual quantity of superheated steam mixed with hydrogen thus remains, which is much higher than in the case of the use of a conventional lower temperature electrolyser (about 80° C.).

Further, the energy contained in this residual steam is usually not wholly usable. Indeed, the only energy consumption it could allow to replace would be $Q_{AL}$ (i.e. the energy quantity necessary to the operation of the evaporator 11 in our example of about 8.4 kWh), but the latter should be fed at the vaporisation temperature of 30 bar, that is 234° C., whereas the residual steam contained in hydrogen condenses at a lower temperature, because of its lower partial pressure at 30 bar. Thus, the residual steam is normally unusable in the high temperature electrolyser and thus partly wasted. Thus, in prior art of FIG. 1b, the condenser E3 only enables half of the steam (temperature decrease from 244 to 160° C.) to be condensed, an exchanger E5 being used as a second condenser to condense the residual steam and dissipate the associated heat.

It is in this residual steam that the present system 1 takes in the desorption heat quantity and not in the heat losses of the HTE 2 which are already inexistent here, unlike what standard electrolysers offer.

For this, the condenser E3 is directly disposed at the outlet of the first exchanger E1, so as to have a sufficient energy level. Preferably, the first exchanger E1 is configured such that the steam and dihydrogen mixture has a temperature of at least 200° C., in the example 244° C. at the outlet (and thus at the inlet of the condenser E3).

By "directly disposed at the outlet", it is meant that there is no heat equipment on the main circuit 10 between the first exchanger E1 and the condenser E3 which will be likely to decrease the temperature of the mixture. In other words, within thermal losses due to the pipings, the temperature of the mixture at the outlet of the first exchanger E1 is substantially equal to its temperature at the inlet of the condenser E3.

A heat circuit 30 (typically containing a liquid coolant not changing phase, for example liquid water at 3 bar or a thermal oil) is preferentially used to transfer the recovered heat (herein both sensible heat of steam and its latent heat, that is the enthalpy of phase change) to the reactor of the chemical compressor. The fluid of the circuit 30 advantageously has a temperature of at least 120° C. at the outlet of the condenser E3.

The water flow rate in the circuit 30 should be as high as possible such that the temperature difference between inlet and outlet of the exchanger E3 (for the coolant of the circuit 30) is as low as possible, in order to ensure an even temperature close 120° C. in the compressor 3. By way of example, a liquid water flow rate of 7 L/min enables the required 2.5 kW exchanged heat to be discharged for a delta T of 5° C. between inlet and outlet.

Preferably, the chemical compressor 3 only comprises a single reactor, unlike prior art where it would have generally three of them. This is allowed by the high temperature level provided via the circuit 4, since as explained, the desorption temperature controls the outlet pressure, and the 120° C. temperature is sufficient to rise all at once the dihydrogen pressure from 30 bar to 200 bar. The present system 1 is thus much simpler and less expensive (since a single stage and thus for example less metal hydrides/less platinum are necessary) than known chemical compressors.

Further, with respect to a system implementing a chemical compressor, the solution has the following secondary advantages: compactness, absence of noise, maintenance costs probably lower, because no movable parts.

At the outlet of the condenser E3, oxygen traces which can remain are advantageously removed by a purifier 31, which can for example be a catalytic oxidation system, and then the dihydrogen flow is cooled in a fourth exchanger E5 thanks to feed water which is heated to be led by the main circuit 10 at the inlet of the evaporator 11 via a third exchanger E4, the fourth exchanger E5 preheating the liquid water to near 100° C. This recirculation loop saves a substantial energy quantity for the evaporator 11, herein the same as in prior art, while keeping the possibility to use almost totally the latent heat of steam.

It is noted that at the outlet of the condenser E3, there can remain about 10% of steam that is not condensed, that is 1.2 bar of partial pressure. This "ultimate" steam is possibly condensed in the exchanger E5, which is thereby a second condenser as in the state of the art of FIG. 1b. With respect to the same, the gain is very sharp since more than 90% of the residual steam is reused, whereas about half of this steam was lost before.

The third exchanger E4 operates heat exchange between the liquid water of the main circuit 10 upstream of the evaporator 11 and the dioxygen from the second exchanger E2 so as to preheat the liquid water entering the evaporator 11. In other words, the third exchanger E4 enables most of the sensible heat of the dioxygen of the circuit 21, which exits at 115° C. to be used.

Likewise, it is particularly advantageous to take advantage of the heat of the condensates (typically 120° C. as the fluid of the circuit 31) of the steam at the condenser E3: the latter are injected via a branch 14 in the main circuit 10 upstream of the evaporator 11. They are mixed with the liquid water exiting from the exchanger exchanger E5 at a mixer 15. The mixture produces liquid water at about 105°

C. even before entering the third exchanger E4. Without this, the further energy consumption in the evaporator 11 would be in the order of 1.4 kWh.

Finally, the residual (liquid) water traces in the dihydrogen flow at the outlet of the fifth exchanger E5 at the outlet of the exchanger are advantageously separated from the hydrogen via a drying system 32 before entering the compressor 3. This drying system is necessary in all the systems dedicated to hydrogen service stations, because the vehicle requires very pure hydrogen.

The purification 31 and drying 32 systems on the other hand enable the intrinsic qualities of the hydride powders of the compressor to be maintained and their oxidation and irreversible deterioration to be avoided.

The fourth exchanger E5 further enables the installation of a dedicated cooling system for the dihydrogen which was necessary before to be avoided.

Figure 1A:
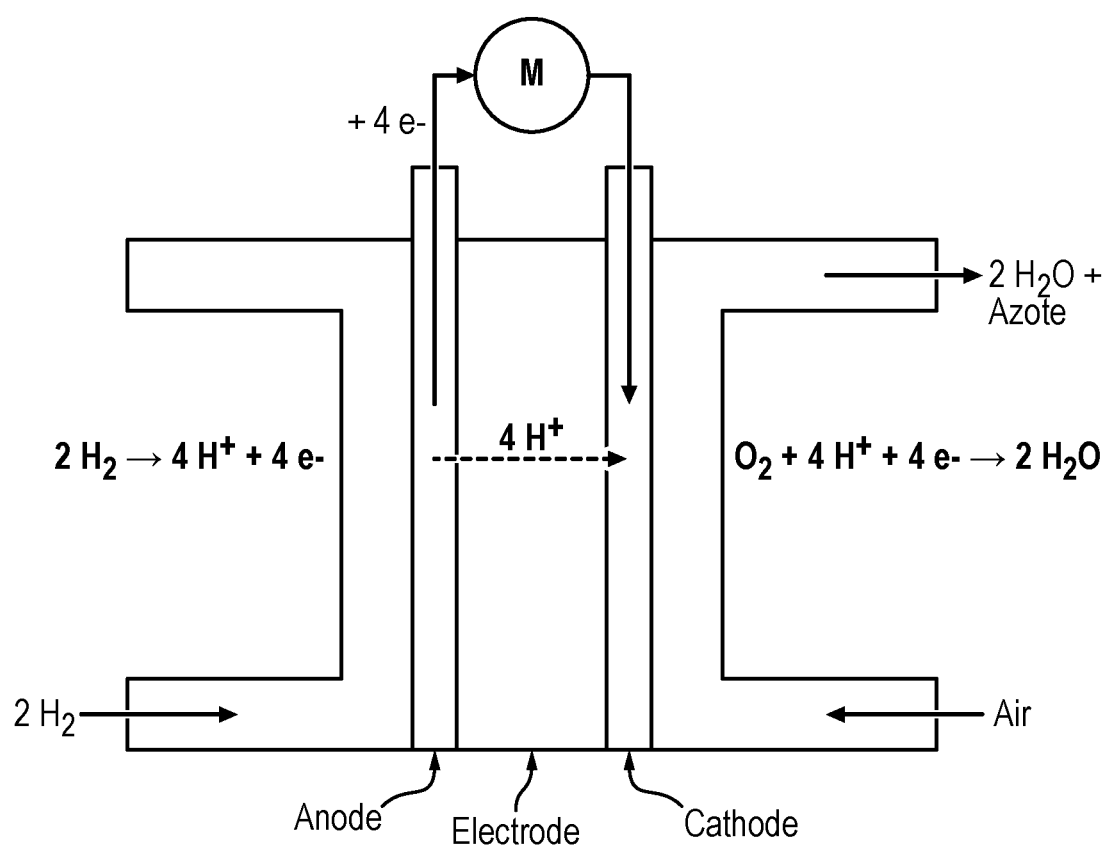
FIG. 1a is a diagram of a known hydrogen cell.
Figure 1B:
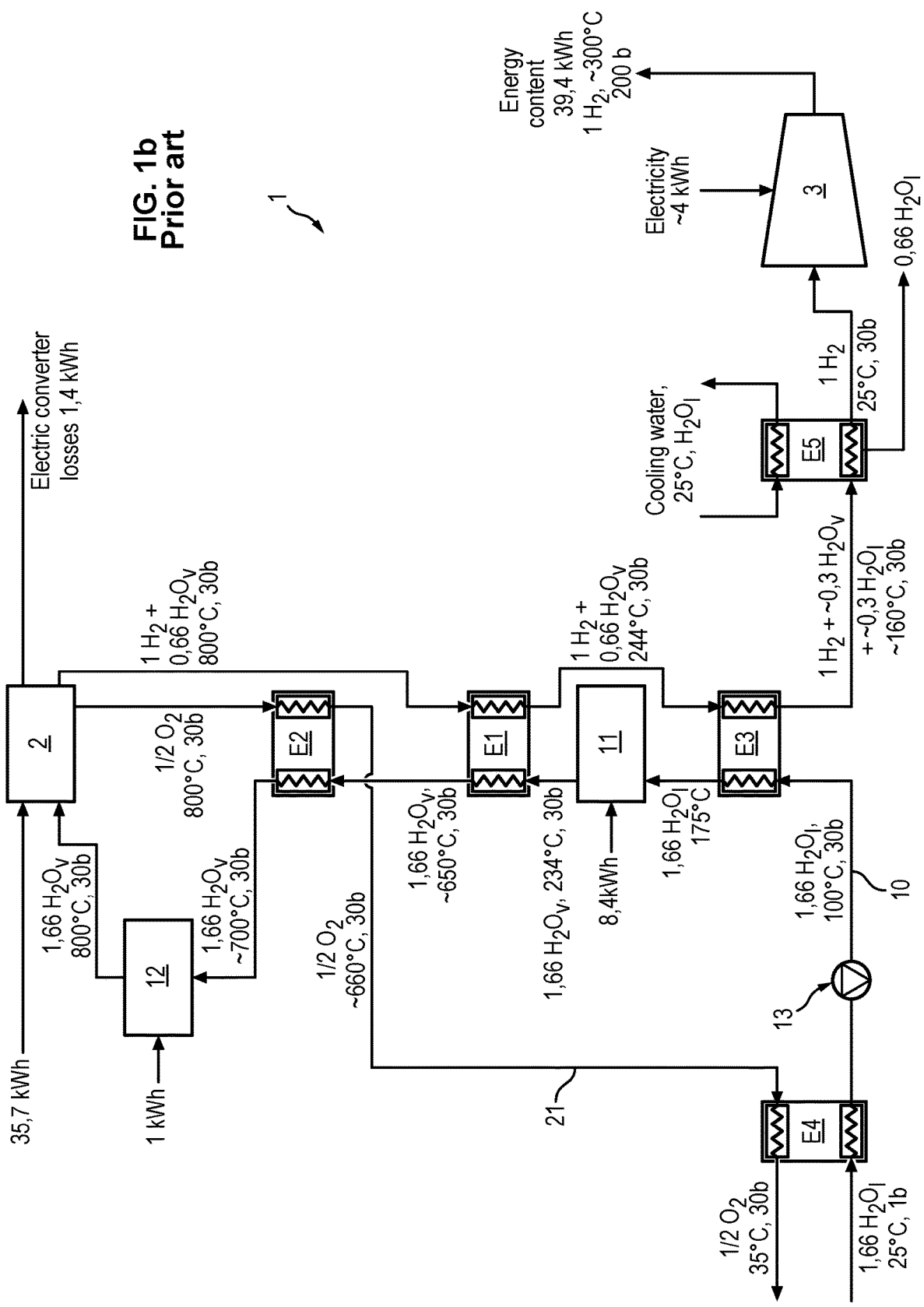
FIG. 1b is a diagram of a known dihydrogen production system.

With $Q_{AL}$~8.4 kWh, the yield of such a fully optimised system is the following one:

$$r=GCV/Qinv=39.4/(35.7+8.4+1)$$

r=87%, that is close to seven points more than the most competitive solution using the high temperature electrolyser according to the embodiment of FIG. 1b, and twelve points more than the most competitive solution using multistage hydride compressors.

Figure 2B:
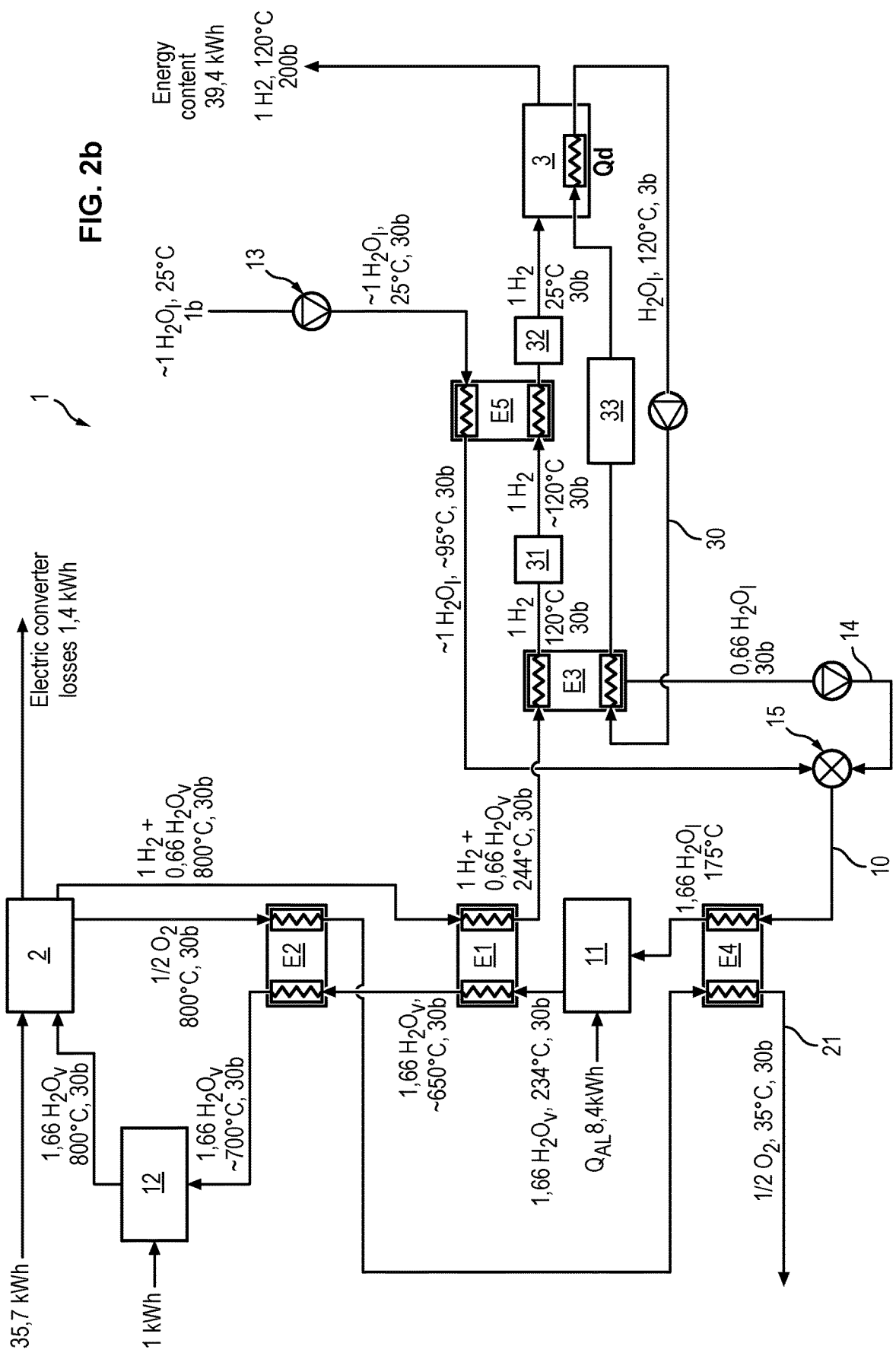

FIG. 2b represents an alternative embodiment of the system 1, in which a second superheater 33 (of the same type as the first superheater 12) is disposed on the heat circuit 30 between the exchanger E3 and the compressor 3.

This superheater 33 enables a so-called "degraded" operating mode to be implemented, wherein heat fed by the residual steam contained in hydrogen is not sufficient to provide the desorption heat $Q_d$. This degraded mode can occur if one or a combination of the following cases happens:
- the conversion rate is higher than 60% in the high temperature electrolyser 2;
- the pipings are poorly insulated and the overall thermal field cannot be recovered;
- the hydrides selected for the compressor 3 have an absorption/desorption heat higher than the thermal field of the residual steam.

The second superheater 33 feeds the heat complement to the desorption reaction. The solution thus remains competitive with respect to a competing solution as long as the electricity quantity consumed in the superheater 33 is lower than the one that a mechanical compressor fulfilling the same task would have consumed.

It can be chosen to implement the solution suggested in the case where the electrical consumption of the second superheater 33 would be high, with the proviso to feed a valuable further value for the user, in particular:
- lesser investment costs than those of a mechanical compressor;
- absence of noise annoyance;
- a better compactness;
- reduced maintenance costs.

Method

According to a second aspect, the invention also relates to a dihydrogen production method implementing by the system 1 according to the first aspect of the invention.

This method comprises the steps of:
- evaporating liquid water in a main water and dihydrogen circuit 10 in an evaporator 11 (liquid water being optionally preheated via a third exchanger E4 and/or a fourth exchanger E5);
- superheating the steam in at least one first exchanger E1 (and advantageously a second exchanger E2 and/or a first superheater 12) at a temperature higher than 500° C., advantageously about 800° C.;
- electrolysing the steam in a high temperature electrolyser 2 so as to produce a steam and dihydrogen mixture;
- cooling said steam and dihydrogen mixture by heat exchange via the first exchanger E1;
- condensing the steam of said mixture directly at the outlet of the first exchanger in a condenser E3 (the condensates being advantageously injected into the main circuit 10 upstream of the evaporator 11);
- compressing the dihydrogen by a chemical compressor 3 (preferentially with a single reactor), supplied with heat by heat exchange with the condenser E3 (advantageously via a heat circuit 30 for circulating a heat fluid without phase change, the condenser E1 heating in particular the heat fluid at more than 120° C. for supplying the chemical compressor 3).

The invention claimed is:

1. A dihydrogen production system (1) comprising:
a high temperature electrolyser (2) adapted to implement steam electrolysis at a temperature higher than 500° C. and produce a steam and dihydrogen mixture;
a dihydrogen compressor (3);
a main water and dihydrogen circuit (10) on which at least one evaporator (11), the high temperature electrolyser (2), a condenser (E3) and the compressor (3) are successively disposed, a first exchanger (E1) operating heat exchange between the steam from the evaporator (11) and the steam and dihydrogen mixture from the high temperature electrolyser (2) so as to superheat the steam from the evaporator (11);
the system being characterised in that
the compressor (3) is a chemical compressor supplied with heat by heat exchange with the condenser (E3);
the condenser (E3) is directly disposed at an outlet of the first exchanger (E1).

2. The system according to claim 1, wherein the first exchanger (E1) is configured such that the steam and dihydrogen mixture exhibits a temperature of at least 200° C. at the outlet.

3. The system according to one of claims 1 and 2, further comprising a dioxygen circuit (21) from the high temperature electrolyser (2), on which a second exchanger (E2) operating heat exchange between the steam from the evaporator (11) and the dioxygen from the high temperature electrolyser (2) is disposed so as to superheat the steam from the evaporator (11).

4. The system according to claim 3, further comprising a third exchanger (E4) operating heat exchange between the liquid water from the main circuit (10) upstream of the evaporator (11) and the dioxygen from the second exchanger (E2) so as to preheat the liquid water entering the evaporator (11).

5. The system according to claim 1, further comprising a first superheater (12) disposed on the main circuit (10) upstream of the high temperature electrolyser (2) so as to superheat the steam from the evaporator (11).

6. The system according to claim 1, further comprising a fourth exchanger (E5) operating heat exchange between the liquid water from the main circuit (10) upstream of the evaporator (11) and the dihydrogen exiting from the condenser (E3) so as to preheat the liquid water entering the evaporator (11).

7. The system according to claim 6, wherein the fourth exchanger (E5) is a condenser.

8. The system according to claim 1, wherein the main circuit (10) receives the condensates from the condenser (E3).

9. The system according to claim 6, wherein the main circuit (10) has a branch (14) for circulating the condensates from the condenser (E3) and a mixer (15) for the liquid water mixture from the fourth exchanger (E5) and said condensates.

10. The system according to claim 1, wherein the chemical compressor (3) is a metal hydride compressor.

11. The system according to claim 10, wherein said metal hydrides are rare earth hydrides.

12. The system according to claim 10, wherein the chemical compressor (3) has a single reactor.

13. The system according to claim 1, wherein a purification system (31) and/or a drying system (32) are disposed on the main circuit (10) between the condenser (E3) and the compressor (3).

14. The system according to claim 1, comprising a heat circuit (30) for heat transfer from the condenser (E3) to the compressor (3).

15. The system according to claim 14, wherein the fluid of the heat circuit (30) has a temperature of at least 120° C. at the inlet of the compressor (3).

16. The system according to claim 14, wherein the heat circuit (30) has a second superheater (33) to superheat the fluid of the circuit (30) at the outlet of the condenser (E3).

* * * * *